United States Patent [19]

Röhm

[11] 3,795,406
[45] Mar. 5, 1974

[54] SELF-TIGHTENING DRILL CHUCK
[76] Inventor: Günter Horst Röhm, Muhlstrasse 9, 9727 Sontheim/Brenz, Germany
[22] Filed: July 3, 1972
[21] Appl. No.: 268,752

[30] Foreign Application Priority Data
July 3, 1971 Germany.............................. 2133142

[52] U.S. Cl......................... 279/56, 279/64, 279/69
[51] Int. Cl.............................................. B23b 31/16
[58] Field of Search....... 279/56, 64, 65, 60, 69, 48, 279/49

[56] References Cited
UNITED STATES PATENTS
2,931,660  4/1960  Barwinkle........................ 279/65 X
2,553,990  5/1951  Vidal .................................... 279/60

Primary Examiner—Gil Weidenfeld
Attorney, Agent, or Firm—Karl F. Ross; Herbert Dubno

[57] ABSTRACT

A self-tightening drill chuck has a rotatable housing carrying a first element formed with a tapered seat on which a plurality of angularly-spaced wedgelike jaws are provided. A second element axially engages the jaws and either the first or second element is threaded on the housing such that its rotation displaces the jaws radially and axially on the seat to clamp the shank of a tool. A body is provided in the housing to form an abutment for the shank end, this body is connected to the other element by means which translate axial pressure against the body in one direction into opposite axial displacement of the jaws to tighten them while forming a shock-absorbing mechanical cushion. Mechanism is also provided which prevents reverse displacement of the jaws during use of the tool, but which permits such displacement for removal of the tool.

10 Claims, 7 Drawing Figures

SELF-TIGHTENING DRILL CHUCK

FIELD OF THE INVENTION

The present invention relates to a chuck and, more particularly to a self-tightening chuck for a drill or other apparatus of the impact (linear-reciprocation) or rotary type.

BACKGROUND OF THE INVENTION

A drill chuck usually comprises a pair of threadedly interconnected elements, one of which is formed with a frustoconical seat on which slide a plurality of wedge-like jaws. The other element axially engages these jaws such that when the two elements are rotated relatively, the jaws are displaced axially and radially on the seat to clamp radially the shank of a tool, such as a drill bit, received therein.

The two elements are arranged such that the torque generated by the normal forward rotation of the drill will be transmitted by the tool through the jaws to these elements to screw them together more tightly. This, of course, requires that the end of the tool not be in abutment with any fixed member of the housing.

When heavy axial pressure is exerted on the drill it is not at all uncommon for the bit to slip back in the chuck, thereby making it impossible for the drill to tighten itself further on the bit. Since self-generated torque is the self-tightening force, overloading is possible, especially where the tool is subjected to considerable strain. Also, no self-tightening is possible without torque. This is difficult with impact-type drills which rotate the bit only limitedly or not at all while reciprocating it axially for boring stone and the like. In many cases self-tightening torques are not generated while in others, the torque may break the chuck. Such drills have hitherto been provided with large chucks having heavy-duty keys which are employed to clamp the bit as tightly as possible. Removing the bit from such a drill is as difficult a job as clamping it in place.

OBJECTS OF THE INVENTION

It is therefore an object of the present invention to provide an improved chuck.

Another object is the provision of a self-tightening drill chuck which overcomes the above-given disadvantages.

Yet another object os to provide a drill chuck which allows easy chucking and removal of the bit and which tightens itself automatically in use.

SUMMARY OF THE INVENTION

These objects are attained according to the present invention by a chuck of the above-described general type wherein a body which is provided in the base of the tool-receiving hole of the chuck is connected to an element axially engaging the jaws by means which translates an axial pressure on this body into an axial pressure in the opposite direction on this element to tighten the jaws about the tool's shank. Means is provided cooperating with this element to allow it to be displaced only in this opposite direction.

The body may act upon a confined hydraulic fluid to displace the element in the opposite direction, or a bellcrank arrangement may be provided. According to a feature of this invention the body has flanks inclined to the axis which coact with radially displaceable wedges in turn having inclined flanks operatively connected to the element so that an axial pressure cams the wedges apart which in turn cams the element axially in the opposite direction.

In such an arrangement the axial force exerted by the tool on the chuck serves to self-tighten it as well as the radial force. Thus in impact-type drills a chuck can be provided which need not even be operated by a gear-reduction key. The chuck can merely be tightened by hand on the tool since use will rapidly complete the tightening.

According to another feature of this invention means is provided for releasing the one-way slip means to release the tool This means is a ring carried on the chuck housing and formed with a spiral camming surface which can be rotated to drive back a spring loaded wedge acting on the body as the slip means.

An important feature of the present invention resides in the provision of a mechanical cushion between the tool and the self-tightening jaws whereby any axial shock which generates the self-tightening force is in part absorbed without excessive strain of the mechanism. The term "cushion" as used herein is intended to describe an arrangement for absorbing and dissipating the kinetic energy of a shock of excess force, e.g. by transforming it into heat. While metallic bodies in direct force-transmitting relation are generally imcompressible, they do act as cushions within the above definition when they are in sliding engagement via wedging surfaces, in this case, part of the energy is dissipated by the limited compression to create compression heat while the remainder is dissipated as heat of sliding friction. When a liquid (hydraulic) medium is provided along the path, it too can dissipate some of the shock energy, while serving as a force-transmitting medium, by limited compression. The cushion can, if desired, include a resilient body or a confined gas space if the cushioning effect is to be enhanced. The force-redirecting means, however, using two or more wedging surfaces generally suffices as the mechanical cushion.

DESCRIPTION OF THE DRAWING

The above and other objects, features, and advantages will become apparent from the following, reference being made to the accompanying drawing in which.

SPECIFIC DESCRIPTION

Figure 1:
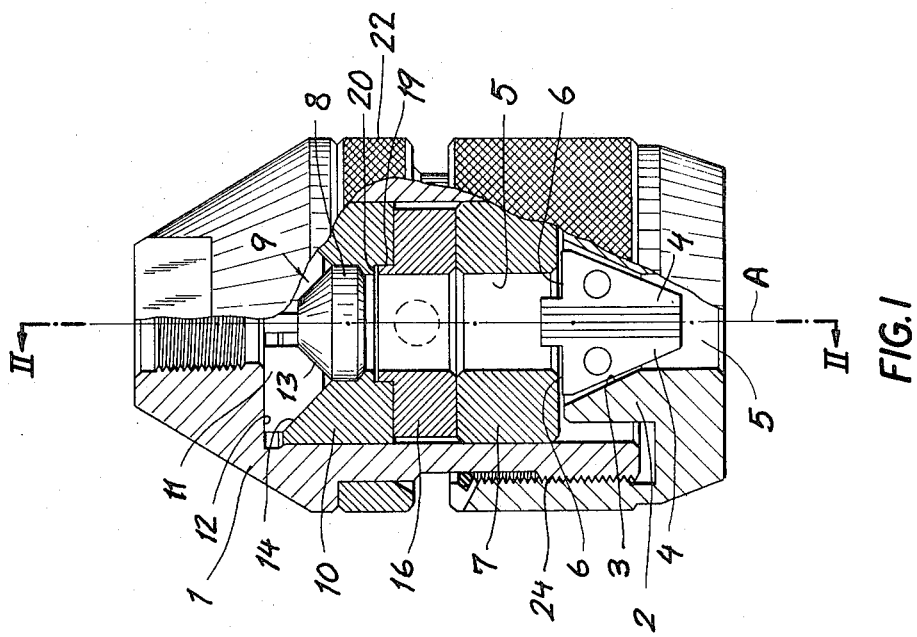
FIG. 1 is an axial section through a first embodiment of a chuck according to the present invention, shown fully closed.
Figure 2:
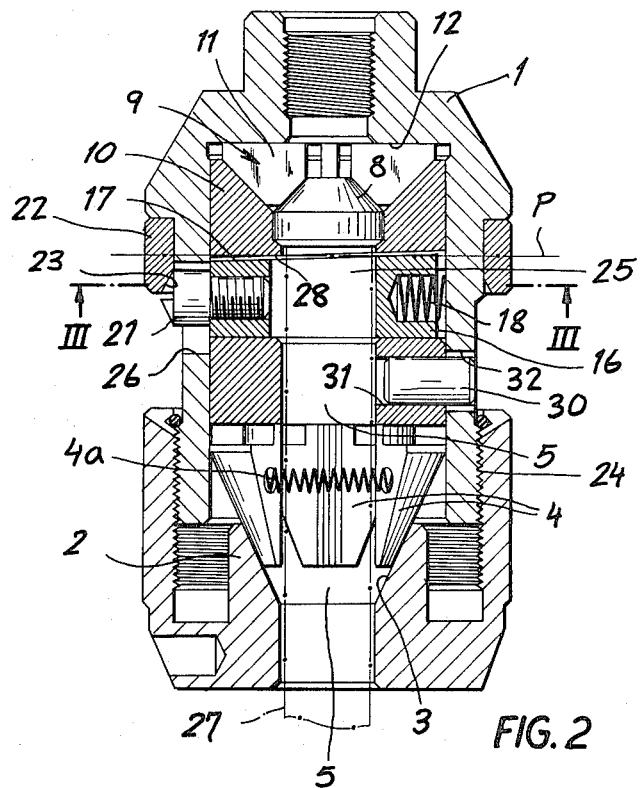
FIG. 2 and 3 are sections along lines II—II and III—III of FIGS. 1 and 2, respectively, with FIG. 2 showing the chuck fully open.
Figure 3:
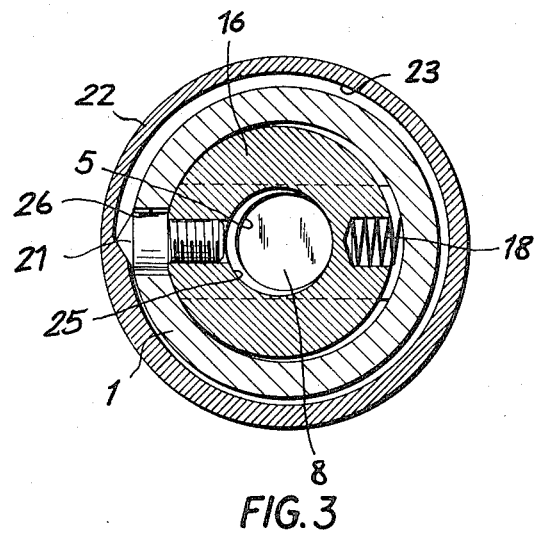

FIGS. 1–3 show a chuck having a housing 1 on which is threaded a collar 2 formed with a frustoconical seat 3 centered on an axis A of the unit. Three wedgelike jaws 4 are angularly spaced along this seat with three springs 4a holding them apart. The entire chuck forms a cylindrical axial hole 5 adapted to receive the shank of a tool shown in dot-dash lines in FIG. 2 at 27. The jaws 4 bear axially also on a ring 7 bearing through another ring 16 on a further ring 10 which is formed with a frustoconical seat 14.

The end of the shank 27 is seated in a body 8 formed with a frustoconical face 13. A plurality of wedges 11 each formed as a ring segment are received between these two oppositely inclined surfaces 13 and 14 and the base 12 of the housing 1. The ring 10 along with these wedges 11 constitute a pressure cushion and automatic tightener 9 for the chuck. Whenever axial pressure is exerted against the body 8, upwardly in FIGS. 1 and 2, the wedges 11 are driven radially outwardly to force the rings 10, 16, and 7 in the opposite direction which in turn causes the jaws 4 to ride up on the seat 3, thereby gripping the shank 27 more tightly. In actuality there is very little movement of these elements, a simple transmission of stresses from one to the other is all that occurs with very minor movement.

The ring 16 is displaceable orthogonal to the axis A, guided by a rib 19 formed on it which fits into a corresponding transverse groove 20 on the face of the ring 10. FIG. 2 shows how this ring 16 has one face 17 which is inclined to a plane P orthogonal to the axis and which fits against a similarly inclined surface 28 on the ring 10. Thus the ring 16 is effectively a wedge which fits between the rings 7 and 10. A spring 18 is provided to urge this wedge 16 in a direction parallel to the rib 19 in order to hold it snugly between the rings 7 and 10. The central hole 25 of the ring-wedge 16 is slightly larger than the hole 5 in order to permit displacement of the ring 16.

Assuming that an axial force is exerted on body 8 and through the wedges 11 on the body 10 to displace the ring 16 and 7 slightly in the axial direction, as soon as this force is released the spring 18 will wedge the ring 16 slightly further in between these rings 7 and 10 to maintain this higher pressure level on the shank 27 by the jaws 4.

In order to facilitate dechucking of the tool 27 aknurled ring 22 surrounds the housing 1 in the region of the cushion and tightener 9. This ring 22 is formed with a spiral camming surface 23 engaging a bolt 21 screwed into the ring 16 and passing through a hold 26 in the housing 1. The ring 22 is normally left in the position shown in FIG. 3, except during chucking of a bit when it is turned to push the bolt 21 in as far as possible in order to provide as much self-tightening range as possible. Before rotation of the collar 2 to dechuck the tool 27 the ring 22 is rotated to push in this bolt 21 in order to destress the jaws 4 as much as possible.

The bolt 21 may be screwed in or out to adjust the chuck, and also serves to prevent rotation of the ring 16. Similarly a pin 30 snugly received in a bore 31 in the ring 7 and passing loosely through a slot 32 in the housing 1 prevents the ring 7 from rotating. The jaws 4 are rotationally coupled to this ring 7. The bolt 21 is adjusted so that all of the elements 7, 16, 10, 11, and 8 lie snugly together with the pin 30 as high as possible, as seen in FIGS. 1 and 2, in the bore 32, with this bolt 21 touching the shallowest part of camway 23.

Figure 4:
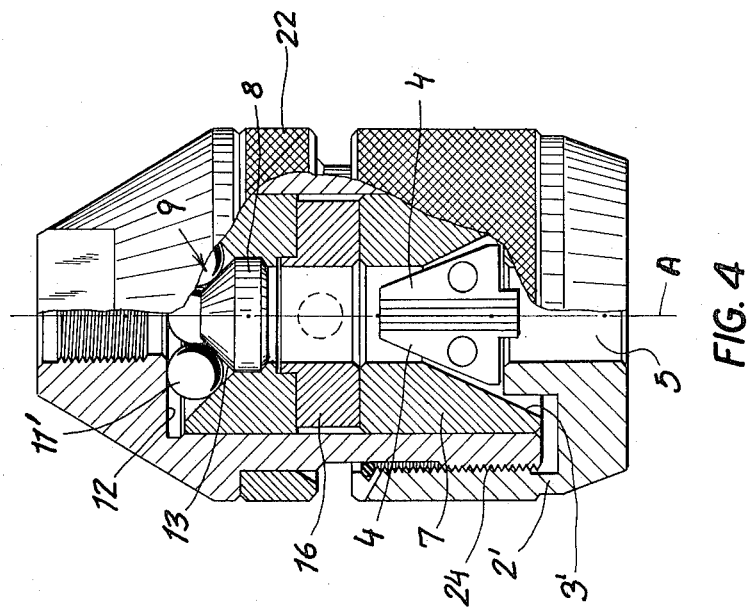
FIGS. 4–6 are views corresponding to FIGS. 1–3, respectively, but showing a second embodiment of the present invention.
Figure 5:
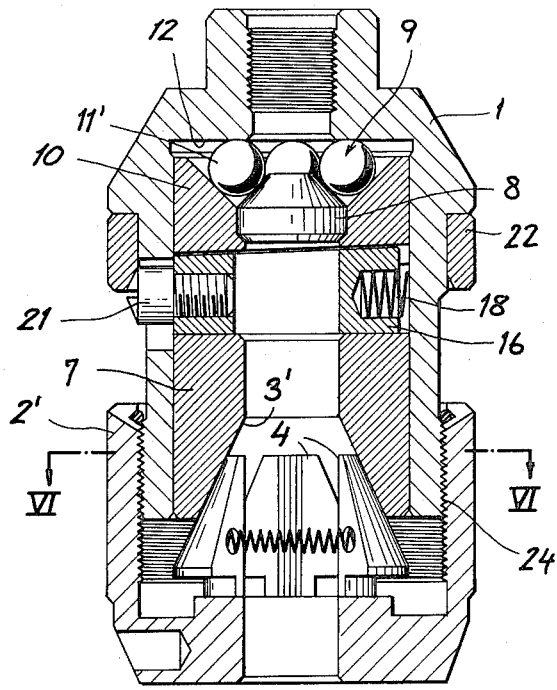
Figure 6:
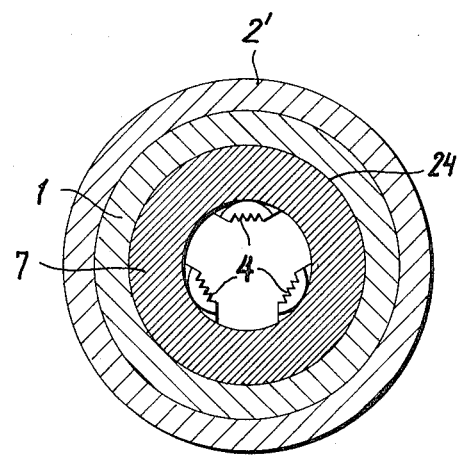

In FIGS. 4–6 structure of identical function is given the same reference numerals as in FIGS. 1–3. Here the seat 3' is formed in the ring 7 and the ends 6 of the jaws 4 bear on the collar 2'. In addition the wedges 11 are replaced by balls 11' riding on the surfaces 12, 13, and 14, these balls 11' functioning in exactly the same manner as the wedges 11 but being somewhat more elastically compressible. In this embodiment the jaws 4 are also fitted into respective grooves 29 in the collar 2' so that they are rotationally coupled to this member. Right-hand threads 24 are provided between the collar and the housing 1 so that torque acting on these jaws also serves to tighten them, as well as axial force as described above.

Figure 7:
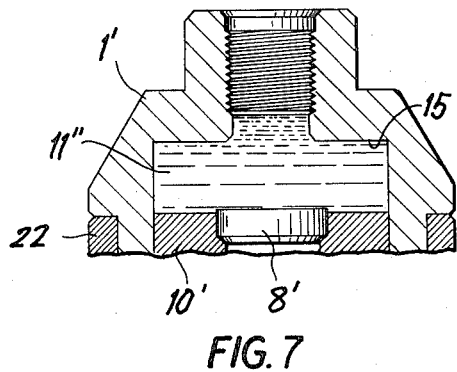
FIG. 7 is a sectional view showing a detail of a third embodiment of the present invention.

FIG. 7 shows a body 8' which along with the ring 10' and the housing 1' forms a closed chamber 15 filled with hydraulic fluid 11'' which acts to translate axial displacement of the body 8' in one direction into oppositely directed axial displacement of the ring 10'. In all other respects this embodiment is identical to that of FIGS. 1–3.

I claim:

1. A chuck comprising:
    a housing adapted to be rotated about an axis;
    a first element formed with a tapered seat around said axis;
    a plurality of wedgelike jaws angularly spaced about the axis of said seat;
    a second element axially engaging said jaws, one of said elements threadedly engaging said housing for rotation to displace said jaws axially and radially on said seat to radially clamp the shank of a tool received by said jaws, the other element being axially displaceable in said housing;
    a body in said housing forming an abutment for said shank; and
    means interconnecting said body and said other element for converting axial force exerted by said tool against said body into an axial force in the opposite direction against said other element while forming a mechanical cushion.

2. The chuck defined in claim 1, further comprising means cooperating with said other element for retaining same against reverse displacement upon movement of said other element in said opposite direction to tighten said jaws against said shank.

3. The chuck defined in claim 2 wherein said means interconnecting said body and said other element includes a plurality of radially displaceable wedges engaging said housing, said body, and said other element.

4. The chuck defined in claim 2 wherein said first element is said one element, said second element being a ring.

5. The arrangement defined in claim 2 wherein said second element is said one element, said first element being a ring.

6. The chuck defined in claim 5 wherein said jaws are rotationally coupled to said second element.

7. The chuck defined in claim 2 wherein said means cooperating with said other element includes a wedge displaceable transverse to said axis and operatively engaged between said other element and said body, and a spring biasing said wedge or urge said jaws against said shank.

8. The chuck defined in claim 7 wherein said wedge is formed with a central axially extending throughgoing hole.

9. The chuck defined in claim 8, further comprising means for displacing said wedge transversely to said axis against the force of said spring for releasing said tool from said jaws.

10. The chuck defined in claim 9 wherein said means for displacing said wedge includes a ring surrounding said housing and formed with a spiral camming surface operatively coupled to said wedge.

* * * * *